United States Patent [19]

David

[11] Patent Number: 4,607,821
[45] Date of Patent: Aug. 26, 1986

[54] SHUTOFF VALVE

[75] Inventor: Walfried David, Maxdorf, Fed. Rep. of Germany

[73] Assignee: Bopp & Reuther GmbH, Mannheim, Fed. Rep. of Germany

[21] Appl. No.: 709,778

[22] Filed: Mar. 11, 1985

Related U.S. Application Data

[63] Continuation-in-part of Ser. No. 574,561, Jan. 27, 1984, abandoned.

[51] Int. Cl.⁴ .......................... F16K 3/12; F16K 27/12
[52] U.S. Cl. ..................................... 251/329; 220/323; 220/328; 251/367
[58] Field of Search ................. 220/328, 378, 323; 251/329, 367; 137/315

[56] References Cited

U.S. PATENT DOCUMENTS

| | | | |
|---|---|---|---|
| 670,977 | 4/1901 | Watson | 220/323 |
| 2,358,814 | 9/1944 | Larsen | 220/328 |
| 2,957,492 | 10/1960 | Volpin | 251/329 X |
| 3,135,286 | 6/1964 | Baumann | 137/315 |
| 3,190,302 | 6/1965 | Volpin | 137/315 |
| 3,333,816 | 8/1967 | Williams et al. | 251/327 |
| 3,963,214 | 6/1976 | Hackman et al. | 251/329 X |

Primary Examiner—Arnold Rosenthal
Attorney, Agent, or Firm—Michael J. Striker

[57] ABSTRACT

A shutoff valve has a housing which is provided in the region of a lateral mounting opening with several holding projections having free ends which extend toward a cover and form an abutment for an edge of the cover, wherein the cover is sealingly mounted in the housing by tensioning pins which are driven between the abutment of the holding projections and a cover edge formed as a counter abutment.

31 Claims, 26 Drawing Figures

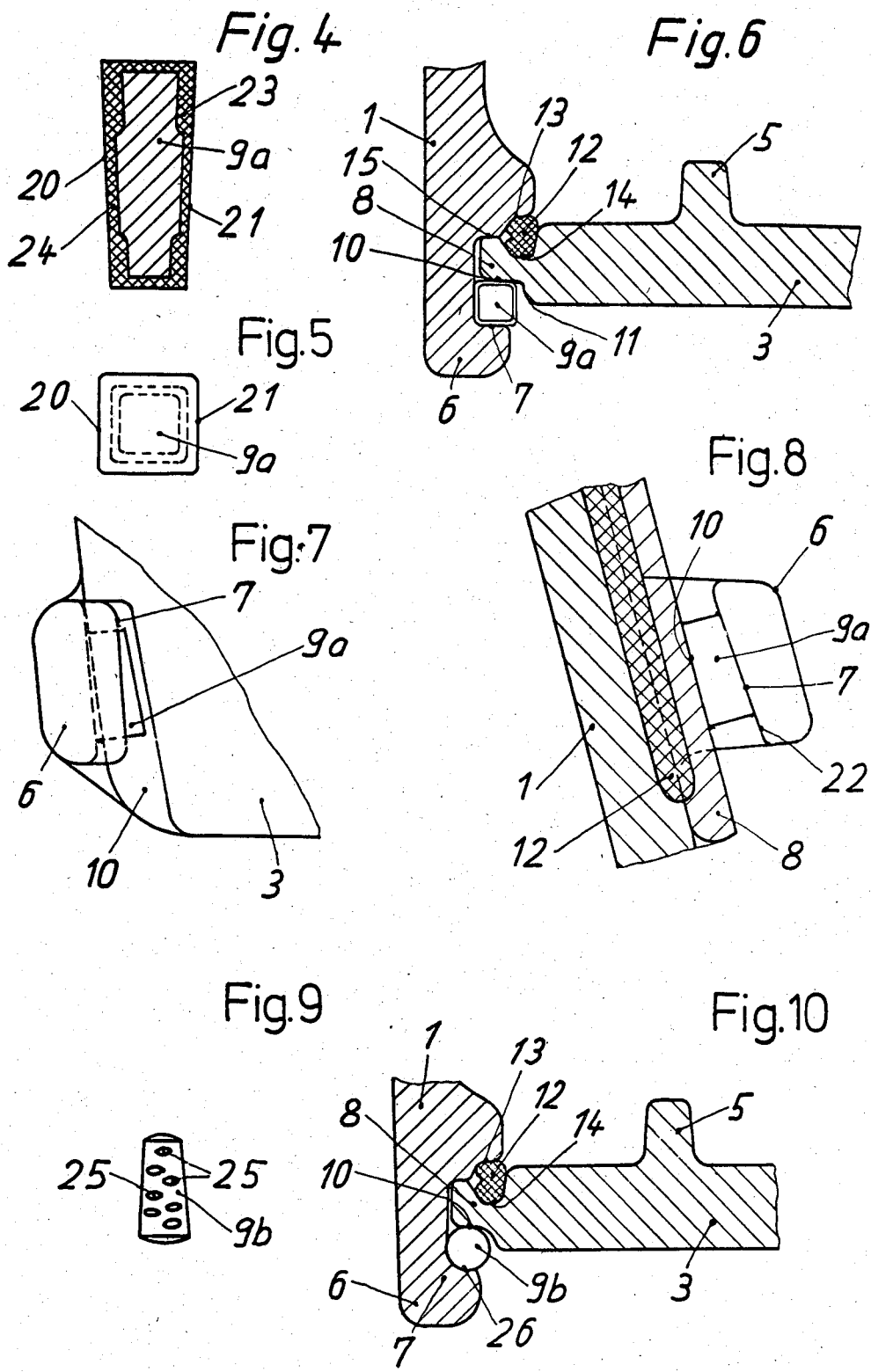

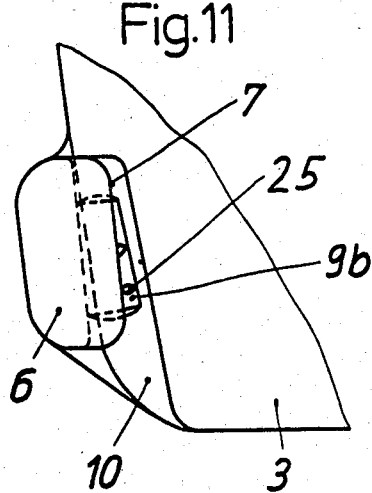
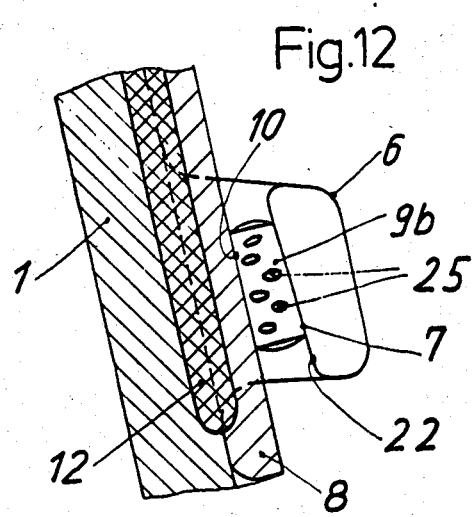
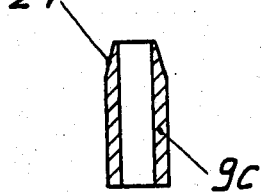
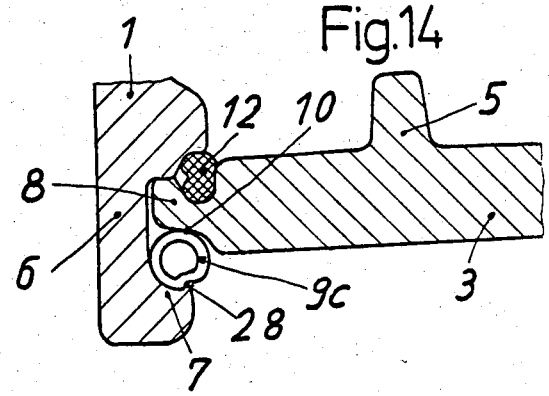
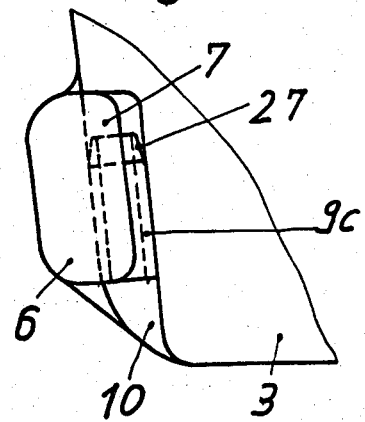
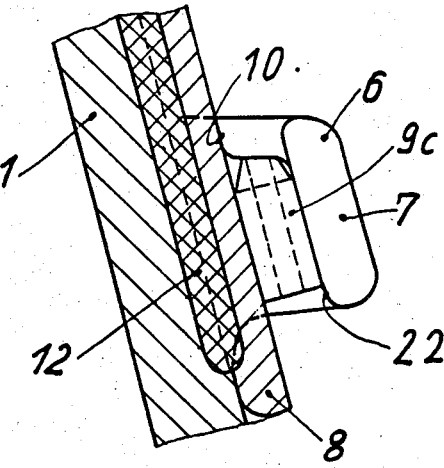

SHUTOFF VALVE

CROSS-REFERENCE TO A RELATED APPLICATION

This application is a continuation-in-part of the application Ser. No. 574,561, filed on Jan. 27, 1984 and now abandoned.

BACKGROUND OF THE INVENTION

The present invention relates to a shutoff valve which has a valve housing including connection pipe for inlet and outlet of flow medium and an essentially vertical central housing wall which forms a chamber for a shutoff member displaceable by a spindle in a direction of the longitudinal axis of the chamber.

In the application Ser. No. 574,561 the shutoff valve is disclosed in which a wall of the housing is provided with a mounting opening with a height and width corresponding to the cross-section of the shutoff member and closeable by a cover, and the housing is closed by a one-piece housing head from above, provided with a central threaded bore which guides a spindle shaft and carries a sealing locking screw.

Since this shutoff valve is provided with the housing head which is of one-piece with the housing and since there is the mounting opening closeable by the cover for the shutoff member, both a separate housing hood with a housing projection and a flange connection with flange connecting screws loadable in a longitudinal direction of the spindle provided in the prior art were dispensed with. The cover mountable on the lateral mounting opening were mounted in this application by socket screws insertable into threaded blind holes of the housing projection. These socket screws with their threaded part are protected from corrosion and the screw heads lie embedded in the stepped through holes of the holding ears cast on the cover. However, the threaded blind holes drilled in the raw cast housing can be subjected to rusting, so that an absolute corrosion protection is here not guaranteed. In addition, for the manufacture of the threaded blind holes, a mechanical working of the housing is required.

SUMMARY OF THE INVENTION

Accordingly, it is an object of the present invention to provide a shutoff valve which avoids the disadvantages of the prior art.

More particularly, it is an object of the present invention to provide a shutoff valve which guarantees a simple mounting for a cover to close a lateral mounting opening of the housing, and which at the same time makes possible a reliable corrosion protection and does not require any working of the housing.

In keeping with these objects and with others which will become apparent hereinafter, one feature of the present invention resides, briefly stated, in a shutoff valve in which a housing in the region of its lateral mounting opening is provided with several holding projections which have free ends bent toward a cover and forming an abutment surrounding an edge of the cover with a distance and the cover is sealingly fixed on the housing by tensioning pins which are driven between the abutment of the holding projections and the cover edge formed as a counter abutment.

Since the cover is sealingly mounted on the housing with the aid of the tensioning screws which are driven outside of the cover between the abutments of the holding projections of the housing and the edge of the cover, an especially simple cover closure is provided which can be obtained with only few manipulations in a short time and for which neither the abutment of the holding projections on the housing nor the counter abutment of the cover must be mechanically worked. The tensioning pins can be driven directly between the raw cast holding projections of the housing and the raw cast cover. The corrosion protection is guaranteed, on the one hand, by conventional surface treatment, for example by an electrostatic synthetic plastic coating of the housing and the cover, and on the other hand, by the utilization of the corrosion-protected and non-rusting tensioning pins.

In accordance with another advantageous feature of the present invention, the holding projections are cast on two opposite longitudinal sides of the mounting opening on the housing. Thereby, the cover due to the holding projections-abutment engaging the same, can be driven from the holding projections-free small side to its end position between the holding projections and the housing edge of the mounting opening.

In accordance with still another feature of the present invention the edge of the cover carries back springs for formation of the counter abutment for the tensioning pins on its outer side in the region of the holding projections or a circumferential back spring. In this case a part of an intermediate chamber required for driving-in of the tensioning pins is provided in the cover and the back springs can form a safety element against lateral withdrawal of the tensioning pins.

In accordance with a further feature of the present invention, the abutment of the holding projections is formed as longitudinal guides for the tensioning pins extending in direction of the cover edge. Thereby the tensioning pins can be unobjectionably guided not in the cover, but instead on the holding projections-abutment over their entire length. They also can abut over a great surface on the cover and on the holding projections, so that they provide for reliable tensioning connection for the cover closure.

In accordance with still a further feature of the present invention, the longitudinal guides of the holding projections are longer than the tensioning pins. Therefore, the tensioning pins do not have any outwardly extending and therefore endangered ends, but instead are completely protected inside the holding projections.

The tensioning pins can be wedge-shaped and can have a wedge-shape with an inclination corresponding to the abutment faces of the holding projections against the counter abutment faces of the cover edges. The counter abutment faces of the cover edge can extend parallel to the cover longitudinal plane, and during driving-in of the tensioning pins provide because of the wedge action a high pressing force which guarantees a sufficient compression of a cover seal and are permissible cover loading and sealing.

The wedge-shaped tensioning pins can have a rectangular, particularly a square cross-section, and support with one of its wedge faces against an inclined flat abutment face of the holding projections, and with its another wedge face against a flat counter abutment face of the cover edge. In this case a tensioning connection for the cover closure is provided which is formed only by flat faces.

With this wedge connection, an active securing against loosening of the tensioning wedge can be provided, when in accordance with another feature of the present invention, the counter abutment of the cover edge has a plurality of sawtooth-depressions extending transverse to the wedge driving direction and providing clamping of the driven tensioning wedge in a withdrawal-blocking manner.

The tensioning pins can be formed as conical notched pins with transverse notches extending in the circumferential direction. The notches are fixedly clamped with the guiding faces of the holding projection-abutment and the counter abutment of the cover edge and thereby a reliable securing against withdrawal of the tensioning pins is provided.

A simple and reliably cover closure is obtained also with cylindrical tensioning pins, when the cylindrical tensioning pins are deformed by a compressing edge extending toward the tensioning sleeve and formed on the circumferentially surrounding holding projection-abutment. By this deformation of the tensioning sleeves, with the aid of the compression edge on the holding projection-abutment, the outer surface of the tensioning sleeve is pressed into the non-flat surface of both abutments on the holding projections and cover edge, so that a fixed engagement between the tensioning pin and the abutment takes place.

The driving of these tensioning sleeves are facilitated when the cylindrical tensioning sleeves are provided with a wedge-shaped driving end, in accordance with still another feature of the present invention. Furthermore, the tensioning sleeves can be provided in their interior with a reinforcing filler introduced after the deformation and composed, for example, of a cast or extruded synthetic plastic material. Because of this during a long operational time, pressure impacts without opening are reliably absorbed by the tensioning sleeves.

An especially fine treatment of the corrosion coat on the abutment faces of the tensioning connection can be obtained when in accordance with a further feature of the present invention, the tensioning pins are formed as cylindrical spreading bushes with spreading mandrels abutting against a holding stop of the holding projections for limiting their longitudinal displacement. The spreading bushes provide during driving of the spreading mandrels no frictional longitudinal movement in the abutments because of their abutment against the holding stop, but instead extend only radially to their tensioning end position and are supported over a great surface on the holding projection-abutment and on the counter projection of the cover.

When the abutment on the holding projections and the counter abutment on the cover edge are formed with return springs or clamping recesses, the tensioning pins are held clampingly between the abutments and cannot be laterally withdrawn from these abutments.

The tensioning pins in accordance with another feature of the present invention are composed of a non-rusting material and therefore the cover closure is completely protected against corrosion in this case.

The tensioning pins can be formed of metal and coated with a vulcanized-on rubber layer. This also provides for a sufficient corrosion protection and simultaneously makes possible because of the high surface friction and the elasticity of the outer surface, also a firm clamping of the tensioning pins with the abutments.

For obtaining a simple mounting of the driving tool, both tensioning pins arranged on longitudinal sides of the mounting opening are advantageously driven in opposite directions freely from outside between the holding projections and the cover around.

A uniform and fast driving-in of the tensioning pins is guaranteed with the aid of a tensioning device mountable on the holding projections and having a presetting for a predetermined driving force.

The tensioning device can be provided with a central pre-stressing piston for pre-stressing of the cover seal. After the cover sealing has been firmly pressed by the pre-stressing piston, the tensioning pins can be driven with the aid of outer driving pistons with a small force and especially finely between the holding projections-abutment and the cover around.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 4 and 5 are a longitudinal section and a plan view of a square wedge-shaped tensioning pin;

FIG. 6 is a cross-section through the holding projection, cover, sealing ring and tensioning pin on a connecting point of the constructions shown in FIGS. 4 and 5;

FIG. 7 is the connecting point of FIG. 6 in a front view;

FIG. 8 is a view showing the same connecting point in a lateral view from a cover center and onto the holding projection with the cover and housing sectioned at the connecting points;

FIG. 9 is a view showing the tensioning pin formed as a conical notched pin;

FIG. 10 is a view showing the cross-section corresponding to that of FIG. 6, through the connecting point with the driven-in conical notched pin;

FIGS. 11 and 12 are views corresponding to FIGS. 7 and 8 at the connecting point with the driven-in conical notched pin;

FIG. 13 is a view showing the tensioning pin formed as a cylindrical tensioning sleeve;

FIGS. 14–16 are views corresponding to the views of FIGS. 6–8, at the connecting point with the driven cylindrical tensioning sleeve;

DESCRIPTION OF PREFERRED EMBODIMENTS

Figure 1:
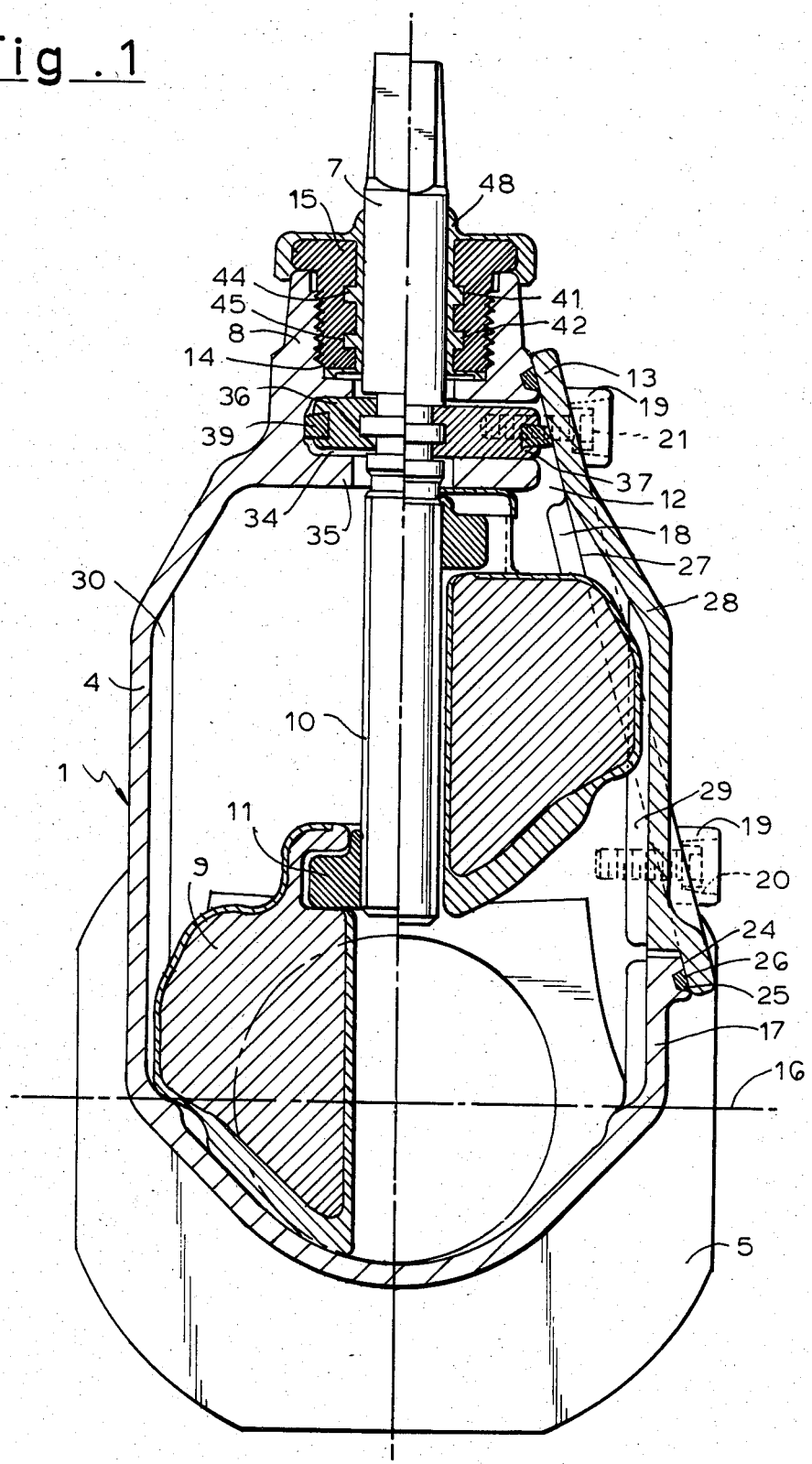
FIG. 1 is a side view showing a shutoff valve housing from the side of the mounting opening and also holding projections in accordance with the present invention.
Figure 2:
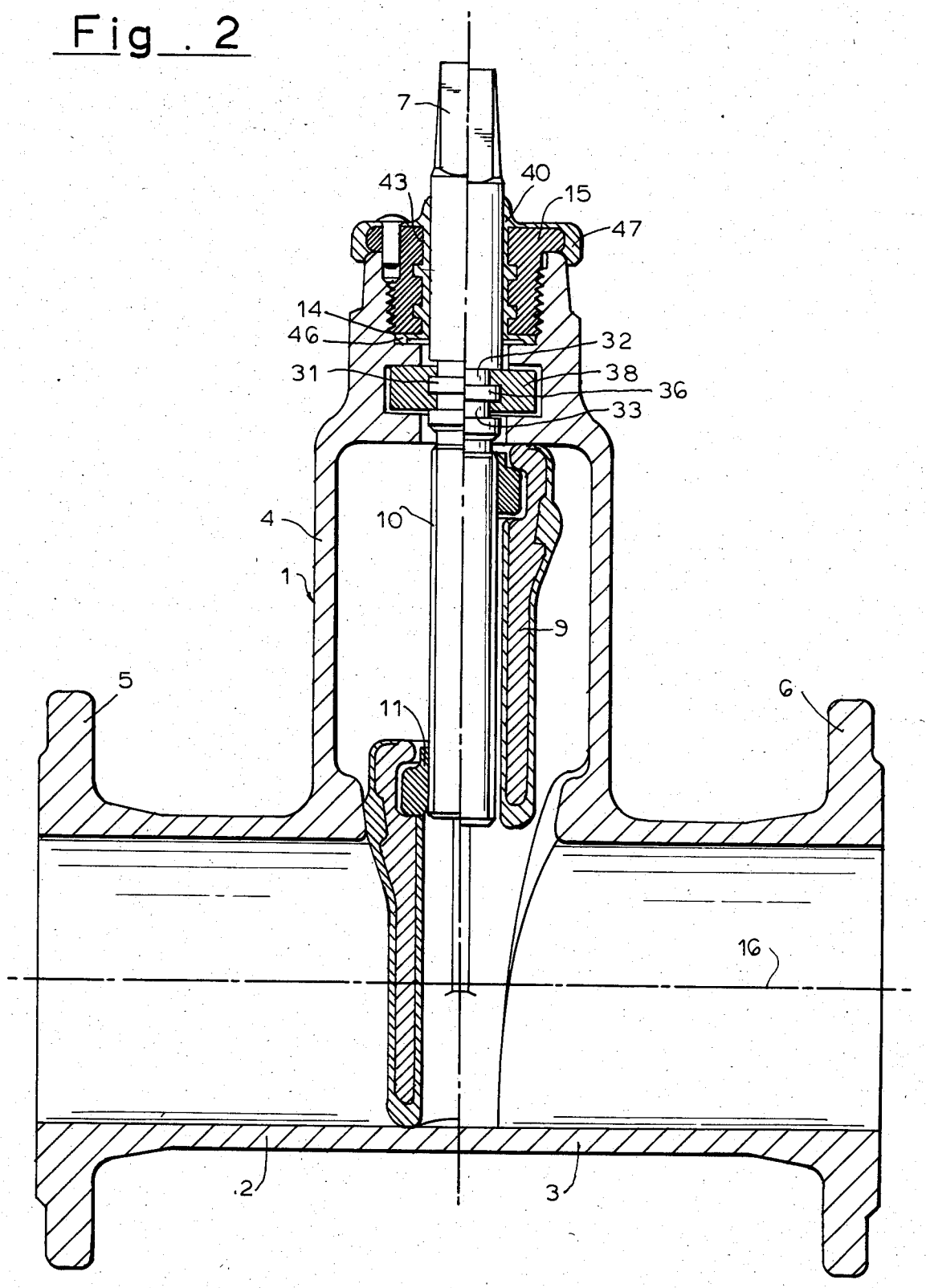
FIG. 2 is a view showing a longitudinal section through the lateral mounting opening with a mounted cover.
Figure 3:
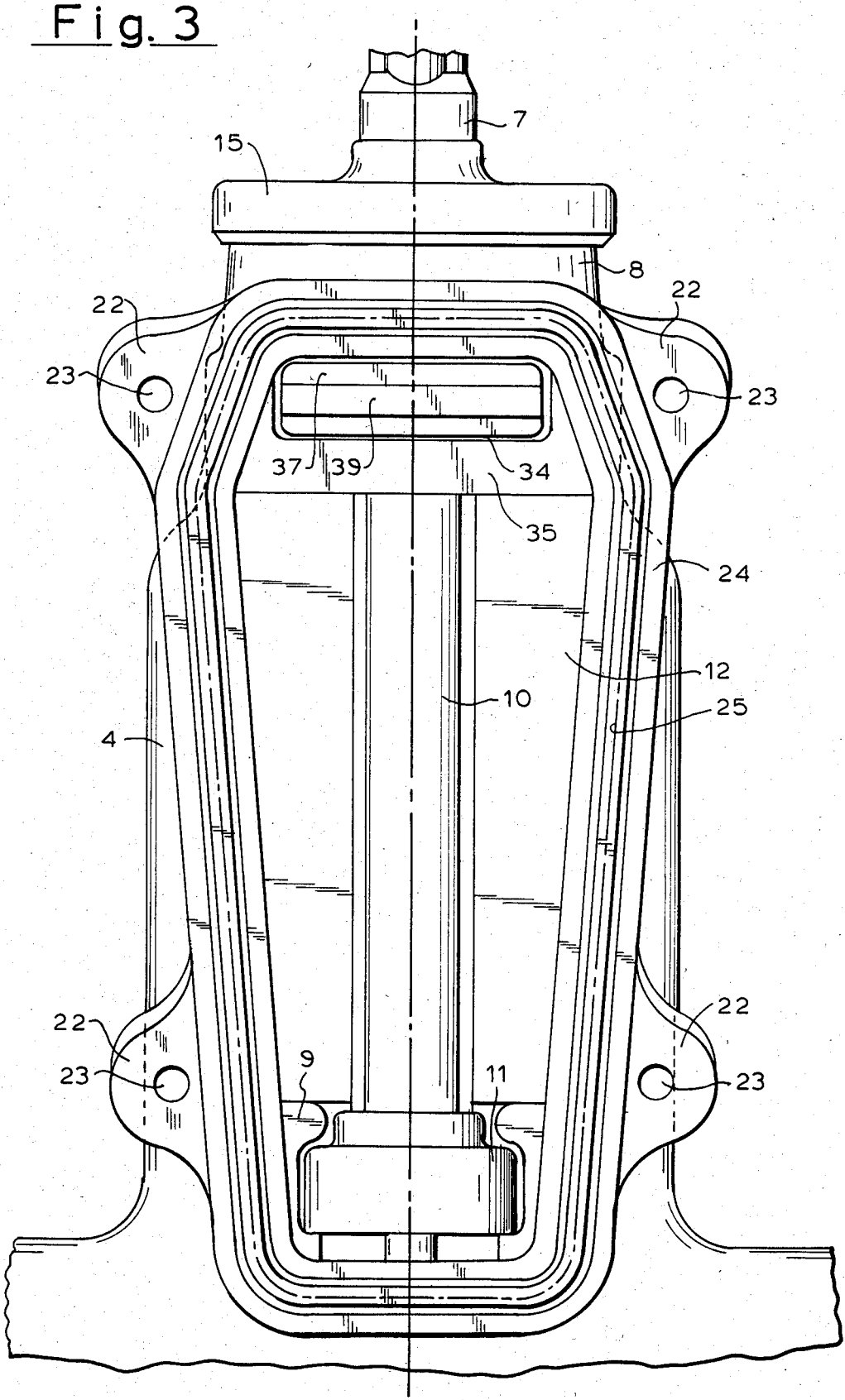
FIG. 3 is a plan view of the cover with a housing and holding projections shown in dash-dot lines.
Figure 17:
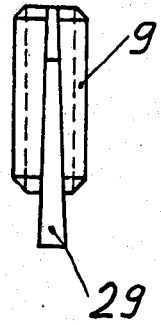
FIG. 17 is a view showing the tensioning pin formed as a cylindrical spreading bush with a spreading wedge.
Figure 18:
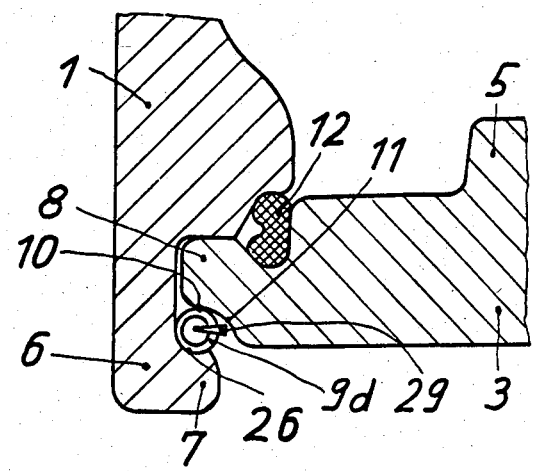
FIGS. 18–20 are views substantially corresponding to the views of FIGS. 6–8, at the connecting point with the spreading wedge driven in the spreading bush.
Figure 19:
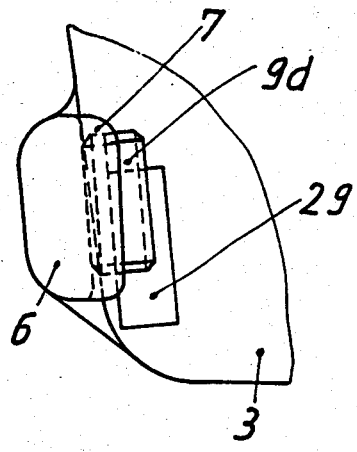
Figure 20:
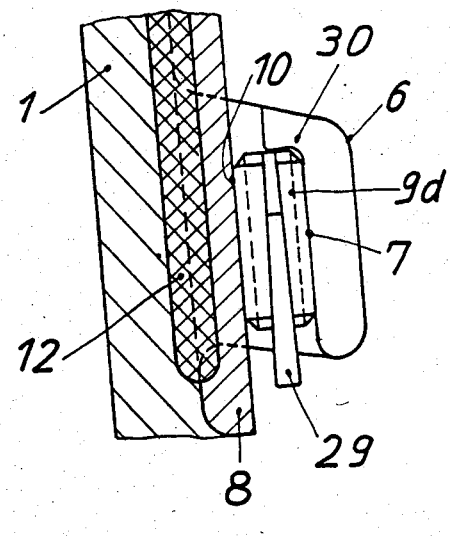
Figure 21:
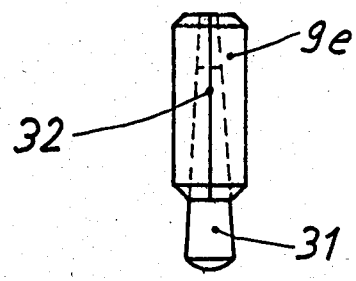
FIG. 21 is a view showing the tensioning pin formed as a cylindrical spreading bush with a spreading cone.
Figure 22:
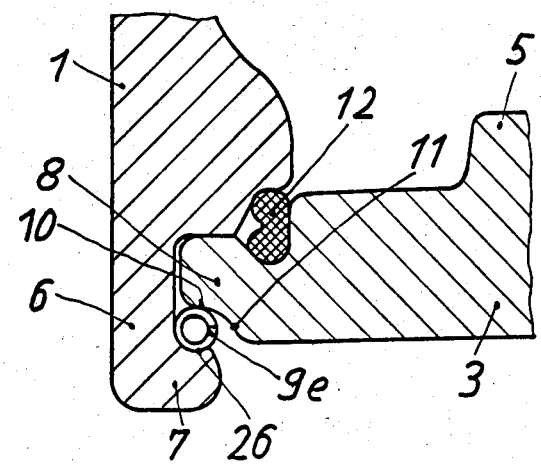
FIGS. 22–24 are views corresponding to the views of FIGS. 6–8 at the connecting point with the spreading wedge driven in the spreading bush.
Figure 23:
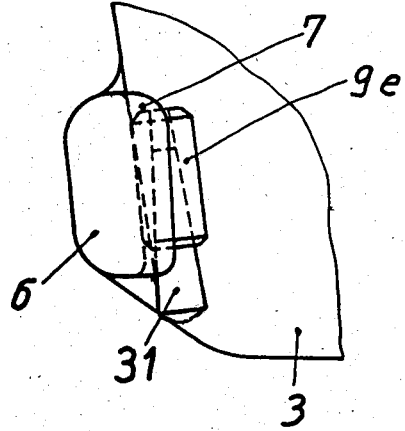
Figure 24:
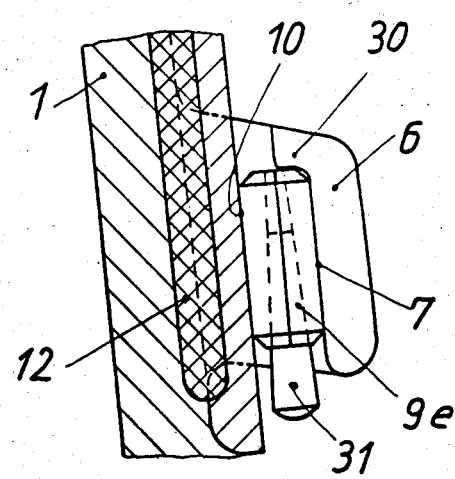

A shutoff valve shown in FIGS. 1-3 has a valve housing 1 provided with a mounting opening 2. The mounting opening 2 is closeable by a cover 3. A shutoff wedge can be brought into housing 1 through the mounting opening. The shutoff wedge is slidingly guided at its one small side by a guiding rib 4 of the shutoff housing 1 and on its other small side by a guiding rib 5 provided on the cover 3.

The valve housing 1 carries in the region of the lateral mounting opening 2 four holding projections 6. The holding projections 6 have free ends 7 which are bent inwardly toward the cover 3 and engage an edge 8 of the cover 3 with a distance. The bent free ends 7 of the holding projections 6 form respectively an abutment for tensioning pins 9 which are driveable between these abutments 7 and the cover edge 8 forming a counter abutment so as to reliably mount the cover 3 on the valve housing 1.

The counter abutment faces on the cover 3 are formed by cast back springs 10 of the cover edge 8. The back springs 10 have edges 11 which form securing means against lateral removal of the tensioning pins 9. The tightness of the cover closure is guaranteed by an elastic sealing ring 12 which abuts against a housing edge 13 surrounding the lateral mounting opening 2 on the one hand, and against an inner groove 14 of the cover 3, on the other hand. The compression of the sealing ring 12 which takes place during driving-in of the tensioning pins 9 is limited by a metallic abutment of an end edge 15 of the cover against the respective housing counter face.

Since the shutoff wedge is inserted from the side through the mounting opening 2 into the valve housing 1, small housing head 16 is required for inserting and holding a valve shaft provided with a shaft collar. The holding projections 6 are cast on both opposite longitudinal sides 17 of the mounting opening 2 on the valve housing, so that the cover 3 is insertable from a small side 18 of the mounting opening 2 into an intermediate chamber 19 between the abutments 7 of the holding projections 6 and the housing edge 13 of the mounting opening 2. After insertion of the cover 3 to its end position, both upper tensioning pins 9 are driven from above and both lower tensioning pins 9 are driven from below in opposite directions so as to maintain a sufficient free space for the actuation of a driving tool.

In the embodiment shown in FIGS. 4-8 a wedge 9a having a square cross-section is used as a tensioning pin. The abutment faces 7 of the holding projections 6 have an inclination corresponding to the wedge shape, whereas the counter abutment faces 10 provided on the cover edge 8 for the simplicity extend half parallel to the cover plane. The wedge shaped tensioning pin 9a abuts with its one wedge face 20 against the inclined abutment face 7 of the holding projection 6 and with its another wedge face 21 against the counter abutment face 10 of the cover edge 8. The abutments 7 of the holding projections 6 are formed as longitudinal guides 22 for the tensioning pins 9a and overlap the tensioning pins at their ends so that they lie protected in the interior of the holding projections 6.

The wedge shaped tensioning pins 9a are provided with vulcanized-on rubber layer 23. Because of this a high friction is provided on the abutment faces so that the tensioning pins are reliably fixed for a long time in the tensioned position. For transmission of sufficiently high tensioning force, the rubber layer 23 is formed with a thin wall in a carrying region 24 of the tensioning pin 9a.

In the embodiment shown in FIGS. 9-12 a notched conical pin 9b is provided as a tensioning pin. The notched conical pin 9b has transverse notches 25 extending in a circumferential direction. The abutments 7 of the closing projections 6 have a recess 26 corresponding to the outer surface of the notched conical pin 9b. The notched conical pin 9b is fixedly clamped in the recess 26 over its transverse notches 25 after its driving-in. The counter abutment face on the cover edge 8, formed by the back spring 10 can also be recessed correspondingly, so that a big surface clamping of the notched conical pin 9b with the abutment faces takes place.

In the embodiment shown in FIGS. 13-16 a cylindrical tensioning sleeve 9c is provided as a tensioning pin. For facilitating its driving-in, the tensioning sleeve 9c has a wedge shaped driving end 27. The abutment 7 of the holding projections 6 which circularly surround the tensioning sleeve 9c has a squeezing edge 28 which is pre-stressed toward the tensioning sleeve 9c. The squeezing edge 28 deforms the tensioning sleeve 9c during driving-in so that it is pressed permanently and fixedly between the abutment 7 of the holding projections 6 and the counter abutment 10 of the cover edge 8.

In the embodiment shown in FIGS. 17-20 a cylindrical spreading bush 9d is provided as a tensioning pin and is expanded by driving of a spreading wedge 29. The spreading bush 9d is supported on a holding stop 30 to prevent its longitudinal movement. Thereby the spreading bushes 9d can first be driven-in without friction to the holding stop 30 between the abutment faces 26 and 10, so that the outer surface protection on the holding projection 6 and on the cover edge 8 is fully maintained. During driving the spreading wedge 29 further, the spreading bush 9d expands in a radial direction and tensions fixedly between the holding projection 6 and the cover edge 8, without coming a sliding movement on the abutment faces. The holding stop 30 is cast in a simple manner on the holding projection 6. The transition 11 to the back spring 10 of the cover 3 is in this embodiment curved so that the spreading wedge 29 is freely driveable in a tensioning direction but secured against lateral sliding out.

In the embodiment shown in FIGS. 21-24, a spreading bush 9e is provided as a tensioning pin and expanded by a spreading cone 31. The spreading bush 9e has a conical inner hollow chamber corresponding to the inclination of the spreading cone 31, so that during driving-in of the spreading cone 31 the spreading bush 9e is expanded over the entire peripheral surface uniformly in a radial direction. Thereby a slot 32 of the spreading bush opens to form a gap.

Here the spreading bush 9e also abuts against the holding stop 30 of the holding projection 6, so that during driving-in of the spreading cone 31 the longitudinal movement takes place not on the abutment faces 26 and 10, but instead only between the spreading cone 31 and the inner hollow cone of the cylindrical spreading bush 9e. The utilization of cylindrical tensioning or spreading bushes has the advantage that the abutment faces 7 on the holding projection 6 and the counter abutment faces 10 on the cover edge 8 can extend parallel to one another in a simple manner.

Figure 25:
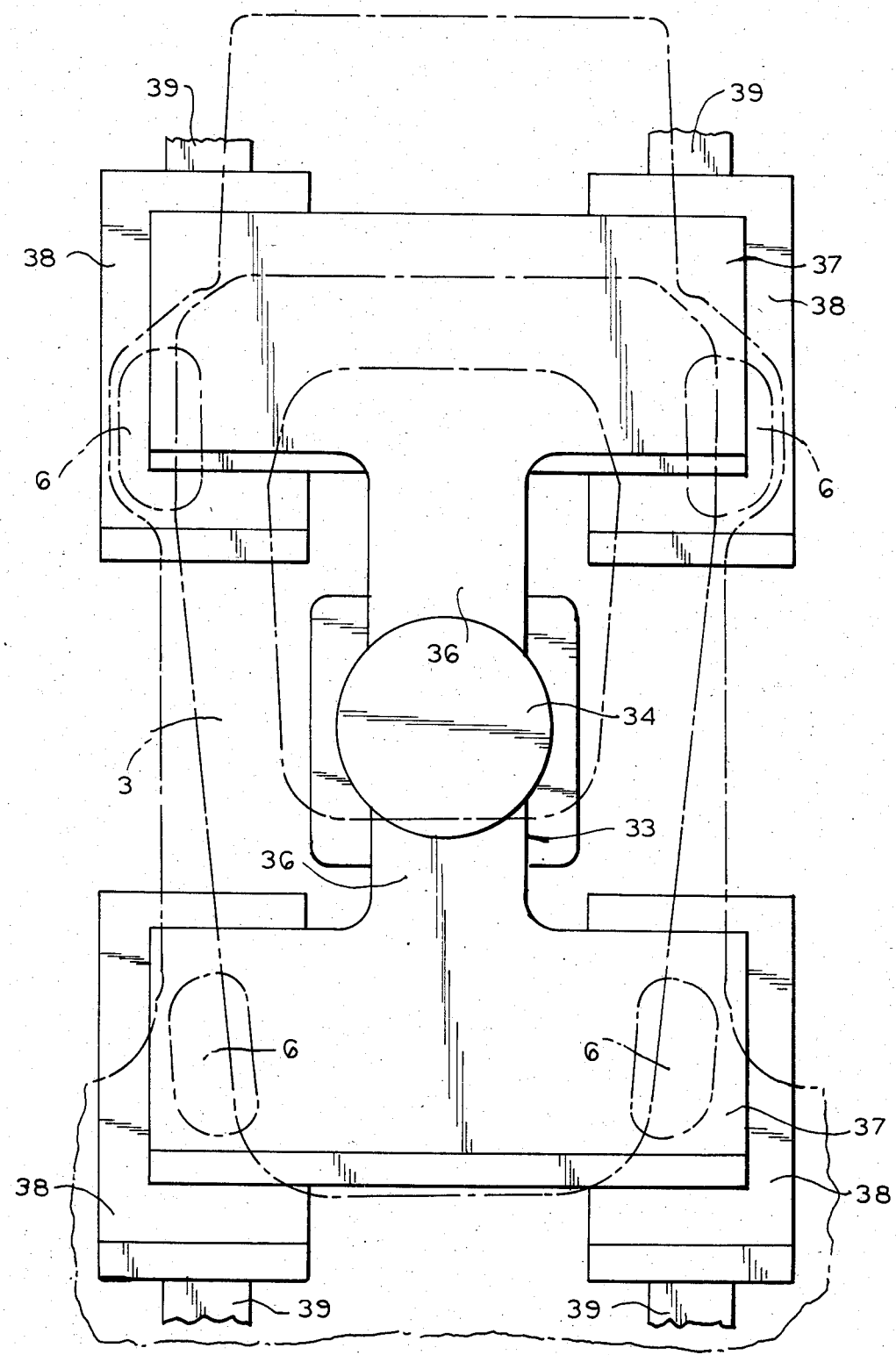
FIGS. 25 and 26 show the tensioning device with a central pre-stressing piston for prestressing the cover seal.
Figure 26:
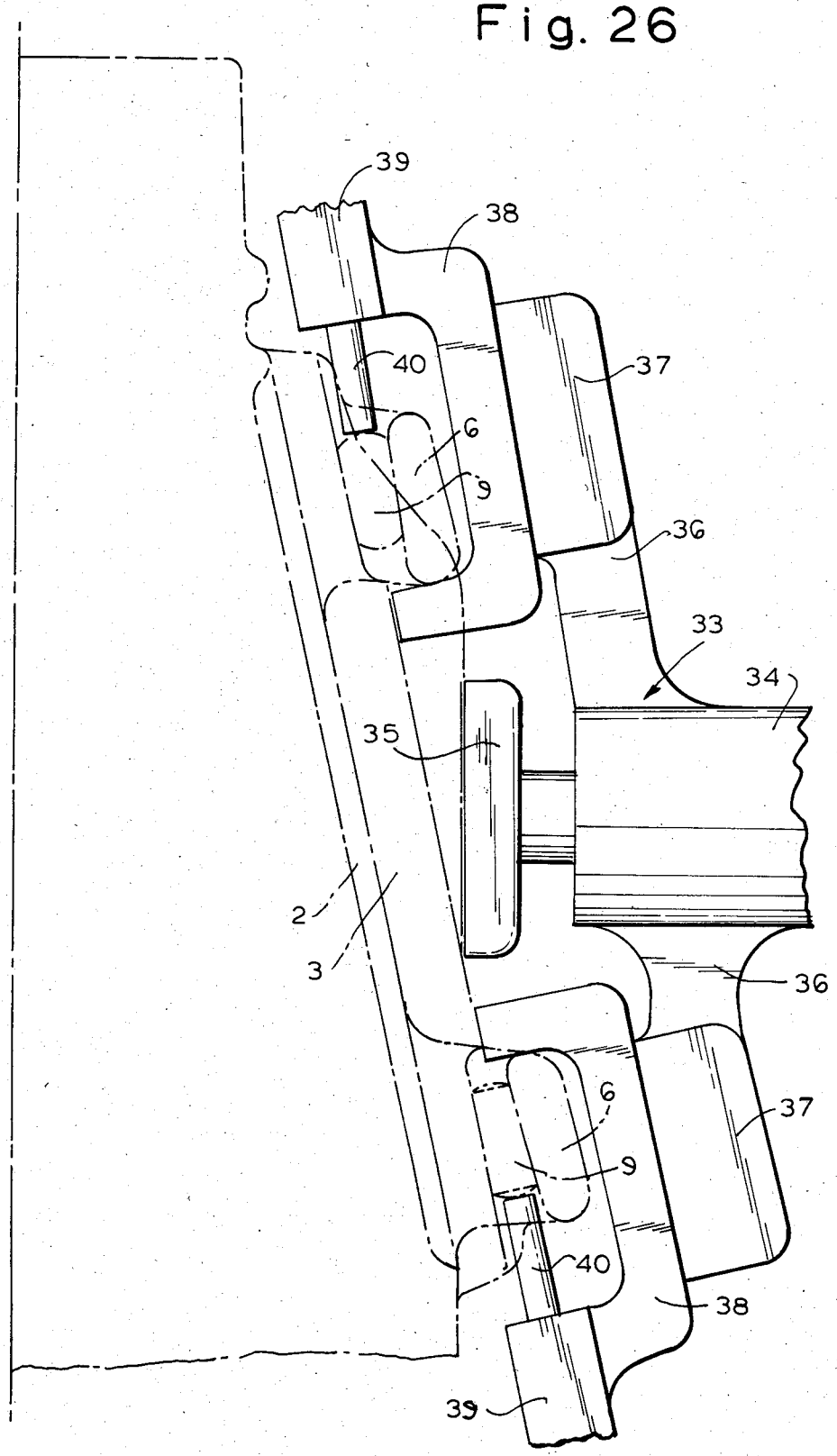

FIGS. 25 and 26 show the cover 3 with the opening 2. Reference numerals 40 designate four outer driving pistons. Reference numeral 34 denotes a cylinder with traverse supports 37.

It will be understood that each of the elements described above, or two or more together, may also find a useful application in other types of constructions differing from the types described above.

While the invention has been illustrated and described as embodied in a shutoff valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A shutoff valve for a flow medium, comprising a spindle; a shutoff member displaceable by said spindle between open and closed positions; and a valve housing having an inlet and an outlet for a flow medium and a housing wall defining an inner chamber for displacing said shutoff body and having a closeable lateral mounting opening with a height and a width corresponding to those of said shutoff body; a cover arranged to close said lateral mounting opening and having an edge which forms a counter abutment; a plurality of holding projections formed on said housing in the region of said lateral mounting opening and having free ends which are bent towards said cover and form an abutment for said edge of said cover; and a tensioning pin driveable between said abutment of said holding projections and said edge of said cover which serve as said counter abutment, so as to sealingly mount said cover on said housing.

2. A shutoff valve as defined in claim 1, wherein said housing wall extends substantially normally to said inlet and outlet, said valve housing having a housing head formed on said housing wall and upwardly closing said chamber of said housing wall, and said spindle having a shaft which is guided and sealed in said housing head.

3. A shutoff valve as defined in claim 1, wherein said housing head is formed of one-piece with said housing wall so as to form a one-piece member.

4. A shutoff valve as defined in claim 1, wherein said housing head has a central threaded opening; and further comprising means for guiding and sealing said spindle shaft and including a locking screw inserted in said central threaded opening of said housing head.

5. A shutoff valve as defined in claim 1, wherein said mounting opening has two opposite longitudinal sides, said holding projections being cast on said housing at said two opposite longitudinal sides of said mounting opening, and said cover being driveable from a small side between said abutments of said holding projections and a housing edge of said mounting opening to its end position.

6. A shutoff valve as defined in claim 1, wherein said edge of said cover for forming said counter abutment is provided at its outer side in the region of said holding projections with at least one back spring.

7. A shutoff valve as defined in claim 6, wherein said back spring is formed as an annular back spring.

8. A shutoff valve as defined in claim 6, wherein said edge of said cover is provided with a plurality of such back springs.

9. A shutoff valve as defined in claim 1, wherein said abutments of said holding projections are formed with longitudinal guides for said tensioning pins extending in direction of said edge of said cover.

10. A shutoff valve as defined in claim 9, wherein said tensioning pins have a predetermined length, said longitudinal guides of said holding projections having a length which is greater than the length of said tensioning pins.

11. A shutoff valve as defined in claim 1, wherein said tensioning pins are wedge shaped, said abutments of said holding projections have faces with an inclination corresponding to the wedge-shape of the tensioning pins relative to the faces of counter abutment of said edge of said cover.

12. A shutoff valve as defined in claim 11, wherein said abutment of said holding projections has an inclined flat face and said counter abutment of said edge of said cover has a flat face, said wedge-shaped tensioning pins having a rectangular cross-section with one wedge face abutting against the face of said abutment of said holding projections and with another wedge face abutting against said face of said counter abutment of said edge of said cover.

13. A shutoff valve as defined in claim 12, wherein said wedge-shaped tensioning pins have a square cross-section.

14. A shutoff valve as defined in claim 12, wherein said wedge is driveable in a driving-in direction, said counter abutment of said edge of said cover having saw-tooth-shaped depressions extending transverse to the driving direction and forming means for preventing loosening.

15. A shutoff valve as defined in claim 12, wherein said tensioning pins are formed as conical notched pins provided with transverse notches extending over its periphery, said abutment of said holding projections and said counter abutment of said edge of said cover having guiding faces with which said transverse notches of said conical notched pin are clamped.

16. A shutoff valve as defined in claim 1, wherein said tensioning pins are formed as cylindrical tensioning sleeves, said abutment of said holding projections having a projecting compressing edge circularly surrounding said tensioning sleeve so that the latter is deformed during its driving-in.

17. A shutoff valve as defined in claim 16, wherein said cylindrical tensioning sleeves are provided with a wedge-shaped driving end.

18. A shutoff valve as defined in claim 16, wherein said tensioning sleeve has a hollow interior filled with a reinforcing filler.

19. A shutoff valve as defined in claim 18, wherein said reinforcing filler is composed of a cast or extruded synthetic plastic material.

20. A shutoff valve as defined in claim 1, wherein said tensioning pins are formed as cylindrical spreading bushes with spreading mandrels, said holding projections having holding stops arranged to limit the longitudinal movement of said cylindrical spreading bushes.

21. A shutoff valve as defined in claim 1, wherein said counter abutment of said edges of said cover is formed as a back spring shaped so that it simultaneously forms a safety element against lateral removal of said tensioning pins.

22. A shutoff valve as defined in claim 1, wherein said tensioning pin has an outer portion, at least one of said abutment and counter abutment being provided with a shaped part corresponding to said outer portion of said tensioning pin so as to clampingly hold the latter.

23. A shutoff valve as defined in claim 22, wherein both said abutment and counter abutment are provided with such a shaped portion.

24. A shutoff valve as defined in claim 22, wherein said shaped portion is formed as a concave recess.

25. A shutoff valve as defined in claim 1, wherein said tensioning pins are composed of a non-rusting material.

26. A shutoff valve as defined in claim 1, wherein said tensioning pins are composed of metal covered with a vulcanized-on rubber layer.

27. A shutoff valve as defined in claim 1, wherein said mounting opening has longitudinal sides, said tensioning pins being provided at both longitudinal sides of said mounting opening and driveable between said holding projections and said edge of said cover in opposite directions from outside.

28. A shutoff valve as defined in claim 1; and further comprising a tensioning device arranged for driving said tensioning pins and mountable on said holding projections.

29. A shutoff valve as defined in claim 28, wherein said tensioning device is provided with setting means for a predetermined driving force.

30. A shutoff valve as defined in claim 28, wherein said mounting opening has an edge; and further comprising a seal arranged between said cover and said edge of said mounting opening, said tensioning device having a plurality of central pre-stressing pistons arranged normal to a cover plate and acting upon said seal, and a plurality of driving-in pistons arranged to act in a driving-in direction onto said tensioning means.

31. A shutoff valve as defined in claim 30, wherein said pretensioning pistons are located centrally, whereas said driving-in pistons are arranged outwardly.

* * * * *